United States Patent [19]

Wieloch

[11] Patent Number: 5,308,965
[45] Date of Patent: May 3, 1994

[54] PILOT LIGHT INTERFACE FOR SMALL INDUSTRIAL CONTROLS

[75] Inventor: Christopher J. Wieloch, Brookfield, Wis.

[73] Assignee: Allen-Bradley Company, Inc., Milwaukee, Wis.

[21] Appl. No.: 944,684

[22] Filed: Sep. 14, 1992

[51] Int. Cl.⁵ .............................................. G08K 7/10
[52] U.S. Cl. .................................. 235/472; 235/385
[58] Field of Search ................. 235/385, 472; 375/48; 340/707

[56] References Cited

U.S. PATENT DOCUMENTS

| | | | |
|---|---|---|---|
| 4,329,684 | 5/1982 | Monteath et al. | 340/707 |
| 4,423,319 | 12/1983 | Jacobsen | 235/472 |
| 4,471,218 | 9/1984 | Culp | 235/472 |
| 4,622,681 | 11/1986 | Snell et al. | 375/48 |
| 4,736,096 | 4/1988 | Ushikubo | 235/472 |
| 4,879,540 | 11/1989 | Ushikubo | 235/385 |

Primary Examiner—Harold Pitts
Attorney, Agent, or Firm—Quarles & Brady

[57] ABSTRACT

A pilot light on a relay or other industrial control module provides human readable information with low frequency modulation and machine readable information at high frequency modulation unintelligible to the human eye. The use of the pilot light eliminates the need for a separate and space consuming human readable display and the modulation method may be a bar code modulation to be readable by commercially available bar code readers.

5 Claims, 3 Drawing Sheets

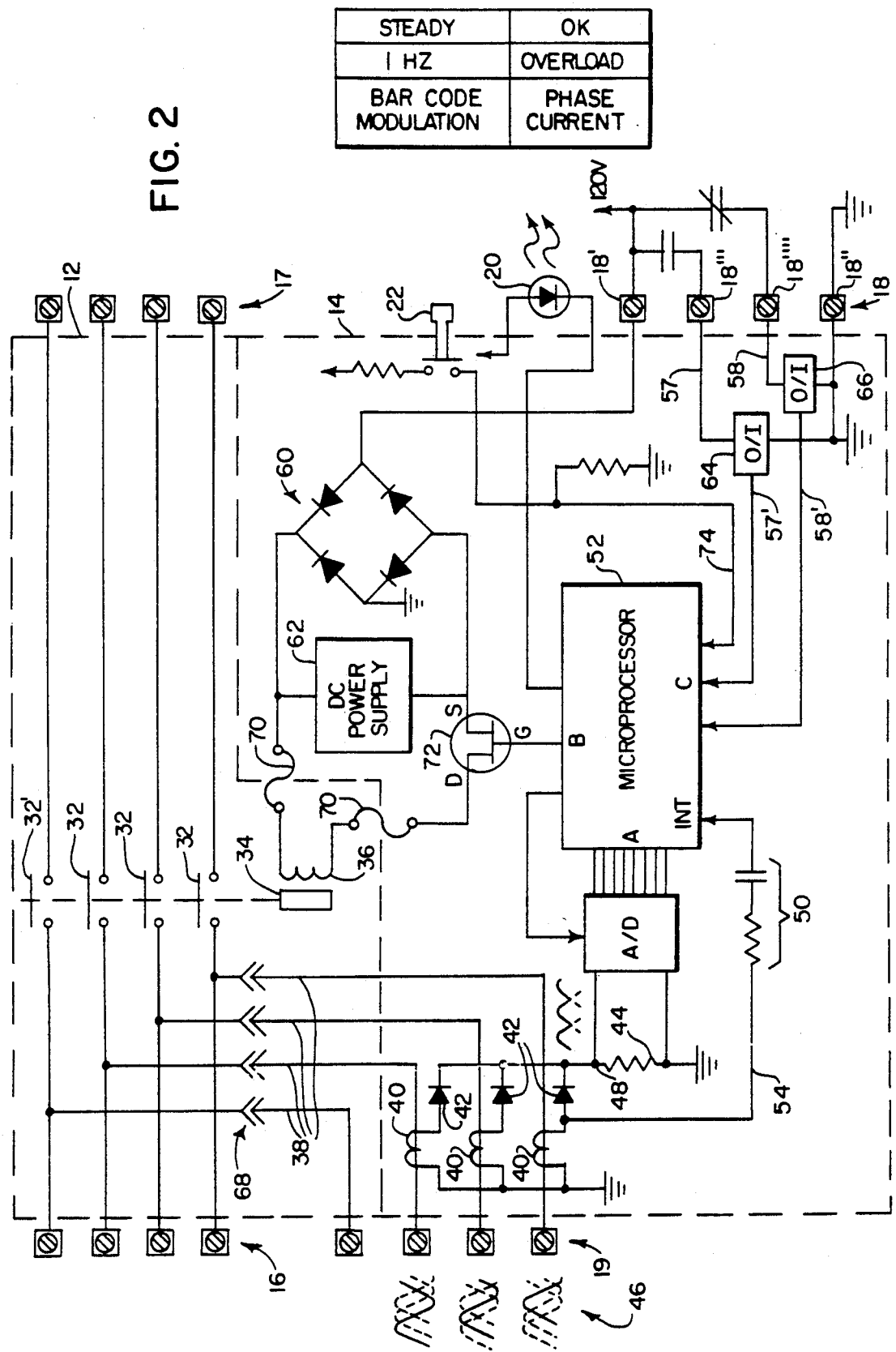

PILOT LIGHT INTERFACE FOR SMALL INDUSTRIAL CONTROLS

BACKGROUND OF THE INVENTION

This invention relates to industrial controls such as overload relays and motor controllers and in particular, to a pilot light for such industrial controls that serves to provide both a visual indication of the operation of the control and to provide machine readable data imperceptible to the human eye. More generally, the invention relates to a low cost digital, optical interface for small electronic apparatuses.

Industrial controls, such as overload relays and motor controllers, are elemental components of industrial electronic control systems such as are found in office buildings and factories. An overload relay, for example, is used with a contactor to control electrical power to large motors. The contactor incorporates one or more contact sets which switch power to the motor's windings. The contact sets are closed by movement of an armature attracted by a magnetic field generated by an armature coil. Thus, the contactor allows the relatively high currents of the motor winding to be controlled by a lower current through its armature coil.

The overload relay receives control signals from remote motor start and stop buttons, and switches the current in the armature coil of the contactor in response to those signals. Importantly, the overload relay also monitors the current flowing through the contact sets and interrupts current to the contactor's armature if the power dissipated by the motor increases beyond a predetermined limit. Increases in motor current may be caused by structural failure of the motor, such as a short between its windings, or by a loading of the motor beyond its rated capacity.

The overload relay may sense the current flowing through the contact sets by means of a resistive heater connected in series with one or more of the contact sets. The resistive heater is in thermal contact with a bi-metallic strip, which at high currents deflects to open a switch and stop current flow to the contactor's armature coil. This, in turn opens the contact set disconnecting the motor windings from the power.

More recently, the current sensing in overload relays has been accomplished by current transformers connected in series with each of the contact sets of the contactor. The current transformers generate an electrical signal, which may be compared to a reference signal to actuate a solid state device, such as a transistor for controlling the armature current.

With the decreasing cost of microprocessors, it has become feasible to incorporate a microprocessor into the overload relay to perform the functions previously performed by discrete electronic circuitry or a bi-metallic strip. A further attraction to the use of a microprocessor is the possibility of performing additional functions, beyond overload protection, such as monitoring and storing data related to the operation of the motor. Although using a microprocessor to collect and store data is relatively straightforward, in the context of the small package size and low cost of the overload relay, communicating the data collected to a human operator is a problem.

A general purpose alphanumeric display is impractical both for reasons of size and cost. A display large enough to be easily readable requires an unworkably large mounting area. Support circuitry and protection from the industrial environment further increase the space demanded by such displays. Increasing the size of the overload relay is unacceptable to the extent that it adversely affects the use of the overload relay in high density wiring applications. The present cost of such displays would significantly increase the cost of the overload relay.

As an alternative to an on-board display, an electrical jack might be used for connection of each overload relay to a remote display device. This avoids some of the cost and space problems described above which requires the user of the overload relay to purchase one or more specialty displays to ensure that a display may be available at the site of each overload relay. Precautions must be taken to prevent contamination of the jack in the industrial environment.

SUMMARY OF THE INVENTION

The present invention uses the pilot light, associated with an overload relay or other industrial control, to transmit machine readable data from an embedded microprocessor to an external reading device. The data is encoded to be invisible to the human eye so that the pilot light may also provide a human readable signal without interference from the transmission of machine readable data.

In particular, in an industrial control module including a processor for collecting primary data and auxiliary data as to the operation of the industrial control module, the invention is a display device having a human readable display element. The display element is modulated in a first manner by a first modulator to convey the primary data concerning the operation of the control module detectable by the unaided human eye, and in a second manner by a second modulator to convey the auxiliary data concerning the operation of the control module detectable by a photo-electric detector.

Thus, it is one object of the invention to allow the improved communication of digital data from a microprocessor incorporated into a package that is too small to support conventional data display devices. A pilot light, which is ordinarily present in devices with an embedded microprocessor, may perform both its traditional function and transmit high speed digital data. The cost and space required for complex driving circuitry and the need for a large mounting space is avoided.

The second manner of modulation, for detection by the photo-electric detector is preferably a bar code modulation method. The modulation of the pilot light simulates the passage of the light and dark bands of a printed bar code.

It is thus another object of the invention to facilitate the transmission of digital data from small sized industrial controls without required specialized data reading and displaying devices. By employing a bar code modulation, a conventional bar code reader may be used to read the data modulated in the second manner. Such bar code readers are of relatively low cost and readily available in most industrial environments.

Preferably, the pilot light is a light emitting diode ("LED"). It is yet another object of the invention to provide an extremely simple, compact and reliable interface for small electronic devices having embedded microprocessors. The LED is rugged and may be sealed in the case to provide a hermetic barrier between the internal circuitry of the controller and the reader. The optical path along which the data is communicated provides electrical isolation between the industrial control and its connected circuits and the reader. The operation of the LED is simply determined visually through its pilot light function.

Other objects and advantages besides those discussed above shall be apparent to those experienced in the art from the description of the preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

BRIEF DESCRIPTION OF THE DRAWINGS

FIG. 2 is a schematic diagram of the circuitry employed in the overload relay of FIG. 1 showing the connection of the pilot light to an output of a microprocessor for communicating data therefrom;

DETAILED DESCRIPTION OF THE PREFERRED EMBODIMENT

Figure 1:
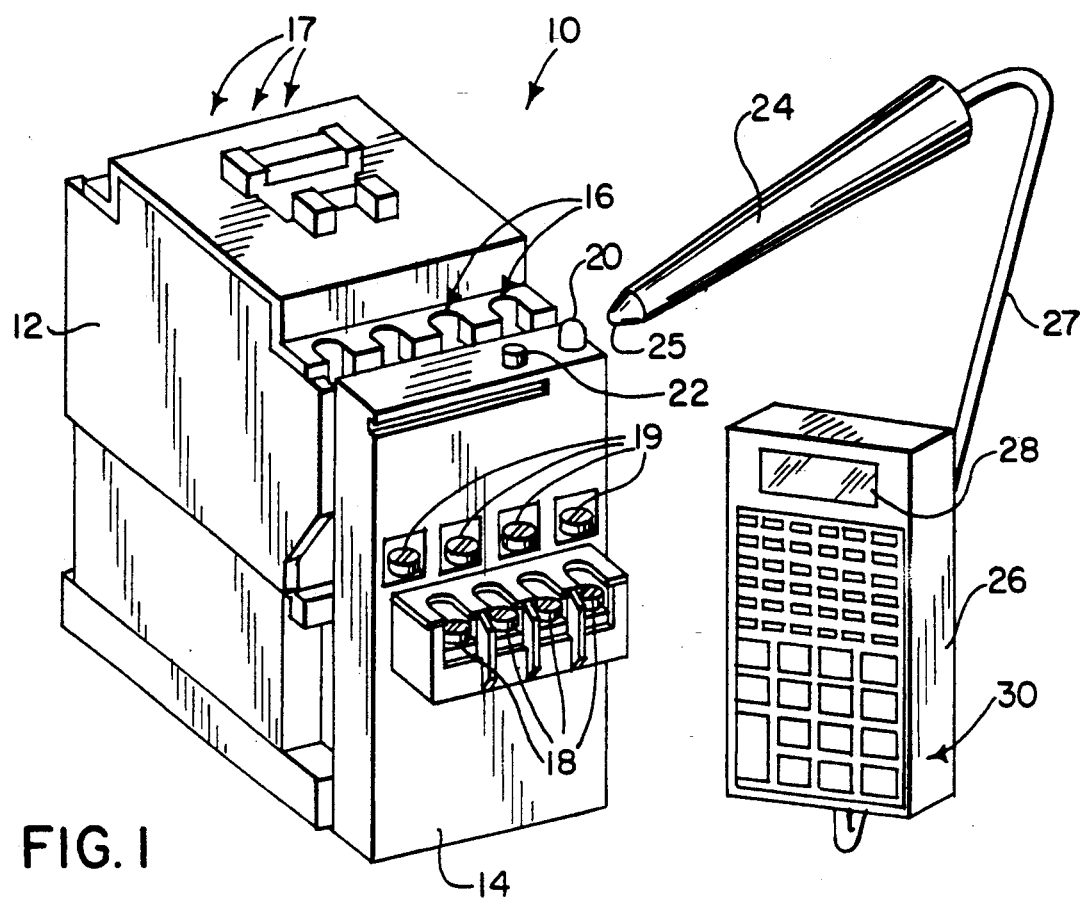
FIG. 1 is a perspective view of an overload relay of the present invention showing the pilot light and the positioning of a hand held bar code reader wand for reading of the digital data.

Referring to FIG. 1, an industrial control 10 includes a contactor 12 and an overload relay 14 physically and electrically attached to the contactor 12. The contactor 12 holds four contact sets (not shown in FIG. 1) connected between line terminals 16 and load terminals 17 accessible along the opposing edges of the top face of the contactor 12.

The overload relay 14 as attached to one side of the contactor 12 holds on a front face away from the contactor 12, control terminals 18 for receiving control signals as will be described and pass-through terminals 19 which are electrically connected to the line terminals 16 and used in lieu of the line terminals 16 when the overload relay 14 is connected to the contactor 12.

The top face of the overload relay 14 supports a pilot light 20 and a pushbutton 22. The pilot light 20 is a light emitting diode ("LED") having an output in the visible region and within the detectable region of the wand's sensitivity. The pilot light is mounted so that during normal operation of the installed overload relay 14 and contactor 12, the pilot light 20 is readily visible and accessible to maintenance personnel. The pushbutton 22 is a momentary contact single throw-double pole switch.

A wand 24 for reading bar codes and having a lens 25 may be positioned so that the lens 25 is proximate to the pilot light 20. The wand 24 includes a photo emitter and photo detector pair positioned behind the lens 25 so as to illuminate and receive reflected light from a printed bar code pattern. In typical operation, the wand 24 is swept past a printed bar code pattern and generates a fluctuating electrical signal indicating the passage of the bar code elements. Although the wand 24 is intended for reading the reflected light from printed bar code patterns, it is generally sensitive to any fluctuating light signals and thus may be used to read not only bar codes but a fluctuating light pattern from the pilot light 20. The wand 24 is preferably one that provides continuous illumination rather than modulated illumination, the latter which is one of a number of schemes used to reject the effects of ambient light.

The wand 24 is attached to a bar code reader 26 by an electrical cable 27 and transmits electrical signals to the bar code reader 26 which decodes those signals according to one of a number of coding standards known in the art. In the present embodiment, the bar code reader 26 is selected to be capable of decoding "three of nine" bar codes. The bar code reader 26 includes a display 28 for displaying alphanumeric characters decoded from the wand signals and a keyboard 30 for entering data into the bar code reader 26. Such wands 24 and bar code readers 26 are well known in the art and commercially available from Allen-Bradley Company of Milwaukee, Wis. under the model numbers 2755-T3 and 2755-W4.

Referring now to FIG. 2, the four contact sets 32 of the contactor 12 are mechanically attached to an armature 34 so that the contact sets 32 open and close in unison with movement of the armature 34. The armature 34 is activated in a conventional manner by an armature coil 36 wound in a solenoid about the armature 34 so as to attract the armature 34 when current flows through the armature coil 36 and to close the contact sets 32.

The contact sets 32, when closed, allow current flow between corresponding pairs of line terminals 16 and load terminals 17. Three of the contact sets 32 are ordinarily used to control the current in the three windings of a three phase motor (not shown). The fourth contact set 32' is typically used to provide a latching capability for the contactor 12.

As noted above, the overload relay 14 is joined to the contactor physically and electrically. The electrical connections include the connection of each of the pass-through terminals 19 to a corresponding line terminal 16 and the connection of the armature coil 36 to a control circuit to be described in detail below. The interconnection of the pass-through terminals 19 and the line terminals 16 is accomplished by mating connectors 68 whereas the interconnection of the armature coil 36 and its control circuitry in the overload relay 14 employs jumpers 70.

In operation, three phase power is connected to the first three pass-through terminals 19 and conducted to the line terminals 16 and hence the contact sets 32 by conductors 38. Current transformers 40 within the overload relay and associated with the conductors 38 of the first three pass-through terminals 19 measure the current flowing through the corresponding contact sets 32 and hence the motor windings.

One lead of each of the current transformers 40 is connected to ground (from power supply 62 to be described) and the other lead of each of the current transformers 40 is connected to the anode of one corresponding rectifying diode 42. The cathodes of these diodes 42 are joined together and connected to one side of a measuring resistor 44.

During normal operation of the contactor 12, when the contact sets 32 are closed, three phases of alternating current 46 will flow through conductors 38 to the respective windings of the motor. The signals produced by current transformers 40 will be sinusoids related in phase to the phases of the alternating current 46. When the signals from the current transformers 40 are rectified by diodes 42 and combined across measuring resistor 44 they produce combined waveform 48 providing the instantaneous peak value among each of the alternating currents 46.

The combined waveform 48, appearing as a voltage across measuring resistor 44, is measured by A to D converter 56 to provide an eight-bit digital word. This eight-bit word is input to a first port A of a microprocessor 52.

Microprocessor 52 is a one chip microprocessor such as the MC6805 manufactured by Motorola Semiconductor Products Inc. of Austin, Tex., a subsidiary of Motorola Inc. The microprocessor 52 incorporates a random access memory ("RAM") read only memory ("ROM"). Also on the microprocessor is a programmable timer for producing a timer interrupt signal, three eight-bit ports for receiving or transmitting eight-bit digital words, and an external interrupt input. Each of these components is well understood to those of ordinary skill in the art, and for clarity, is not shown in FIG. 2. In the present invention, ports A and C are configured for input and port B is configured for output during initialization of the microprocessor 52 as will be described.

Initialization of the A to D conversion cycle, defining the instant at which the combined waveform 48 is transformed into an eight-bit word, is controlled by an output of port B under control of microprocessor 52 to be described.

The peak current flow through any winding of the motor may be determined from this combined waveform 48 and the knowledge of the phase of the alternating current 46 associated with one winding. That latter knowledge is provided by a phase timing signal 54 derived directly from one current transformer 40' prior to rectification of its signal by diode 42 and which is connected through a filter network 50 to the external interrupt input of microprocessor 52. The interrupt input receives the phase timing signal 54 and generates an interrupt at the zero crossing of that phase timing signal 54.

Referring still to FIG. 2, during operation of the overload relay 14, the control terminals 18 receive line voltage and line ground at terminals 18' and 18" respectively. Control terminals 18 also receive an "on" signal 57 through terminal 18''', typically from a pair of normally open contacts of a pushbutton connected between 18' and 18''' and an "off" signal 58, typically from a set of normally closed contacts tied between line voltage at 18' and terminal 18''''.

Terminal 18' connects the line voltage to one AC node of a full wave rectifier 60 and terminal 18" connects the other AC node to line ground. The DC nodes of the full wave rectifier 60 provide unfiltered DC to power supply 62 and to the armature coil 36 of the contactor 12 as will be described. Power supply 62 provides regulated DC to the microprocessor 52 and the A to D converter 56. The ground point of the current transformers 40 is also connected to the power supply 62. Such connections are not shown for clarity but as will be understood to those of ordinary skill in the art.

The "on" signal 57 from terminal 18''' drives the input side of an optical isolator 64 which produces an isolated signal 57' input into one input of port B of the microprocessor 52. Correspondingly, the "off" signal 58 from terminal 18'''' is connected to the input of a second optical isolator 66 to create isolated "off" signal 58' which is connected to another input of input port B of the microprocessor 52. The optical isolators also receive power from the DC power supply 62.

One output from port B of the microprocessor 52 is connected to the gate of an MOS transistor 72 which controls the flow of unfiltered DC from the full wave rectifier 60 through the armature coil 36. Specifically, DC from the full wave rectifier 60 is connected through jumper 70 from the overload relay 14 to the contactor 12 to provide current to the armature coil 36 when the contact sets 32 are to be closed. The other lead of the armature coil 36 connected through a second jumper 70 to the drain of MOS transistor 72.

The anode of pilot light 20 is connected to the positive voltage from the DC power supply 62 and its cathode is connected an output of port B.

Pushbutton 22 is connected between the positive voltage of the DC power supply 62 and an input of port C to provide a reset signal 74 to be described.

Thus the microprocessor 52 may measure the current flowing through the contact sets 32 and control the closure of those contacts in response to signals at its control terminals 18. The microprocessor may further communicate with a user through pilot light 20 and pushbutton 22.

Figure 4:
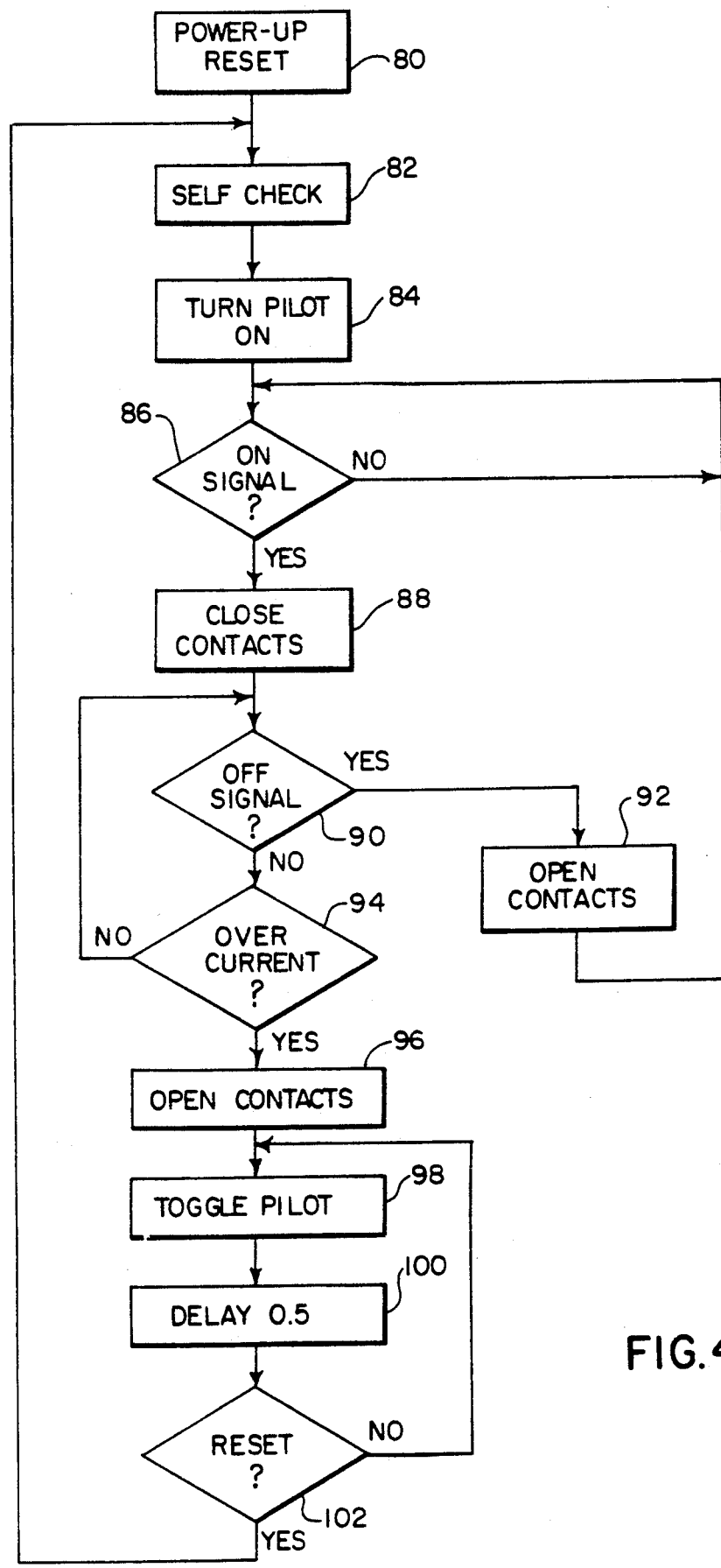
FIG. 4 is a flow chart showing the program running in the microprocessor of FIG. 2 for controlling the modulation of the pilot light.

Referring also to FIG. 4, when power is first applied to terminals 18' and 18", energizing power supply 62 and thus microprocessor 52, microprocessor 52 enters a power-up reset mode indicated by process block 80. The reset clears registers, as is generally understood in the art and performs a portion of a program stored in microprocessor ROM which initializes the ports A and C to input and B for output and which loads internal timer counter values as will be described below.

At the conclusion of the power-up reset indicated by process block 80, the program of the microprocessor 52 performs a self check which checks operation of the microprocessor and its associated circuitry.

At the conclusion of the self check indicated by process block 82, the program of the microprocessor 52 turns on the pilot light 20, at process block 84, indicating that the overload relay 14 is functional and in operation.

At decision block 86, after the pilot light 20 is turned on, the microprocessor 52 checks for an "on" signal 57' indicating that the contact sets 32 of the contactor 12 should be closed. If there is no "on" signal 57', the program loops at decision block 86 until such a signal is received.

Once an "on" signal 57' is received, the program proceeds to process block 88 and the contact sets 32 are closed by energizing armature coil 36 via MOS transistor 72 which is connected to microprocessor 52.

With closure of the contact sets 32, the program moves to decision block 90 to see if an "off" signal 58' is present at terminal 18''''. If an "off" signal 58' is present, the program advances to process block 92 and the contact sets 32 are opened by de-energizing armature coil 36 via transistor 72 attached to microprocessor 52. Once the contact sets 32 are open, the program returns to decision block 86 to determine whether an "on" signal 57 is present.

Alternatively, at decision block 90, if no "off" signal is present, the program moves to process block 94 to evaluate the current flowing through the contact sets 32 which may indicate that the windings of the attached motor are drawing excess current. The peak value of the current in each of the motor windings may be determined by evaluating the combined waveform 48 in light of the timing information of phase timing signal 54 previously described. This evaluation is performed on a real time basis through interrupt routines as will be described below. The result of this evaluation, however, is that the peak values of each current of the alternating currents 46 passing to the motor windings are stored in RAM in the microprocessor 52 in variables designated $\phi 1$, $\phi 2$, and $\phi 3$, where $\phi 1$ is from the current associated with transformer 40' and hence the phase timing signal 54.

The evaluating interrupt routine is initiated by the zero crossing of the phase timing signal 54 connected to microprocessor 52. This interrupt signal from this zero crossing causes the microprocessor 52 to suspend the program of FIG. 4 and to execute an interrupt routine. The interrupt routine loads the internal timer of the microprocessor 52 with a number to measure a 1.38 millisecond delay. A phase counter variable, $\phi_{count}$, is also set to zero. The interrupt routine then modulates the pilot light 20 to transmit one ASCII character in binary fashion, as will be described below, and then terminates.

At the expiration of the 1.38 milliseconds, a timer interrupt is generated, again interrupting the program of FIG. 4. The timer interrupt begins a conversion by the A to D converter 56. The result of that A to D conversion is stored in $\phi 1$ as pointed to the $\phi_{count}$ variable which is incremented. The timer is again loaded but with a value providing 5.56 milliseconds of delay, that delay being the time to the peak value of the next phase of the alternating currents 46. The timer interrupt then terminates and the program of FIG. 4 is resumed.

The timer interrupt is repeated every 5.56 milliseconds until each of the variables $\phi 1$, $\phi 2$, and $\phi 3$, has been updated as indicated by $\phi_{count}$. No more timer interrupts are executed until the next external interrupt.

Thus the peak values of each of the currents in the three phases of alternating current 46 are updated and stored on a real time basis independent from the program of FIG. 4.

Referring again to FIG. 4, the over current decision block 94 evaluates each of the variables, $\phi 1$, $\phi 2$, and $\phi 3$, against a threshold power dissipation level based on $i^2t$. If the values of $\phi 1$, $\phi 2$, and $\phi 3$ meet the power dissipation criterion, then there is no over current and the program loops again to decision block 90 to investigate whether an "off" signal 58' has been received.

If one or more of the phases at decision block 94 is greater than the predetermined maximum, there is an over current condition and the program proceeds to process block 96 which opens the contact sets 32 by control of MOS transistor 72.

After the contact sets 32 are opened at process block 98, the pilot light 20 is toggled to indicate an over current condition. The toggling turns the pilot light 20 on, if it is "off", and off if it is turned "on". A delay of one-half second follows at process block 100 so that the toggling will be apparent to a human viewer.

The program next proceeds to process block 102 to determine whether a reset signal has been received from pushbutton 22. If no reset has been received, the program loops to process block 98 and the pilot light 20 continues toggling.

If a reset is received, the program returns to process block 82 for a self check and to repeat all the subsequent steps described above.

As mentioned above, the external interrupt routine also serves to periodically transmit an ASCII character in binary fashion via the pilot light 20. Specifically, the external interrupt routine checks to see if the pilot light 20 is on and if so transmits the ASCII character in bar code. Together, the ASCII characters provide a message: "PHASE ONE=$\phi 1$ PHASE TWO=$\phi 2$ and PHASE THREE=$\phi 3$, where $\phi 1$, $\phi 2$, and $\phi 3$, are the actual values of the variables $\phi 1$, $\phi 2$, and $\phi 3$.

The transmission rate of the bar code is approximately 1 kilohertz and so may be accomplished readily prior to expiration of the loaded 1.38 milliseconds or the 5.5 milliseconds time delay separating the measurements of the alternating current 46.

Figure 3:
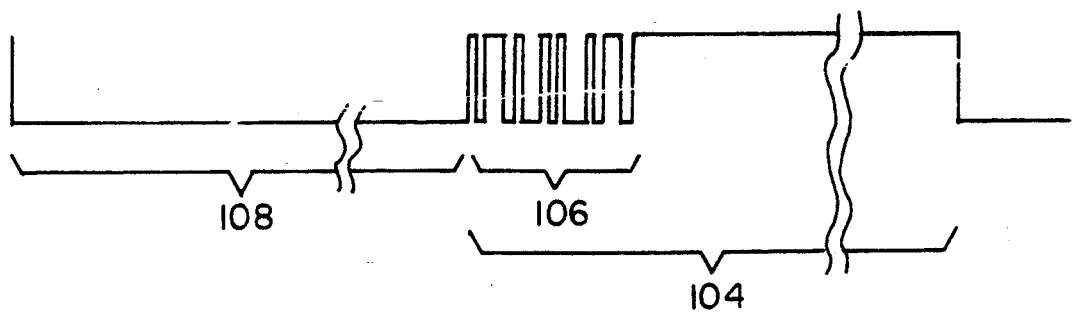
FIG. 3 is a graph indicating the intensity of light from the pilot light as a function of time and indicating the combination of the first and second modulation of the pilot light to provide human and machine readable data.

Referring now to FIG. 3, during the toggling of the pilot light per process block 98 of FIG. 4, the transmission of the ASCII character by the pilot light 20 will occur only during an "on" period 104 of the pilot light and will comprise less than 50% of the total "on" period 104 and thus be practically imperceptible to a human observer. Nevertheless, the bar code modulation 106 will be detectable by a bar code reader 26 and decoded over the space of a number of interrupts and typically less than one second. On the other hand, the "off" time 108, comprising one-half a second or more, will be readily detectable by a human observer to indicate the status of the overload relay generally and may be completely independent of the bar code modulation 106. Further, the steady "on" state of the pilot light 20, prior to any overload, will be visually uninterrupted by the bar code modulation 106.

The above description has been that of a preferred embodiment of the present invention. It will occur to those that practice the art that many modifications may be made without departing from the spirit and scope of the invention. For example, pilot light 20 may be used to convey a wide variety of other information and different meanings can be ascribed to the human visible modulation of a steady or flashing LED. As used herein, a steadily illuminated LED should be considered to be a form of human readable modulation.

In order to apprise the public of the various embodiments that may fall within the scope of the invention, the following claims are made.

I claim:

1. A display device for an industrial control module, the industrial control module including a processor means for collecting primary data and auxiliary data as to the operation of the industrial control module, the display device comprising:
   a lamp for being modulated in a first manner readable by the unaided human eye and a second manner readable by a photoelectric detector;
   a first modulator modulating the lamp in the first manner under the control of the processor to convey the primary data concerning the operation of the control module so that the modulation is visible to the unaided human eye; and
   a second modulator modulating the lamp in the second method under the control of the processor to convey the auxiliary data concerning the operation of the control module so that the modulation of the second method is not detectable by the unaided human eye and thus does not interfere with the perception of the primary data by a human observer.

2. The display device as recited in claim 1 where the second method is a bar code modulation pattern.

3. The display device as recited in claim 1 wherein the human readable element is a solid state light source.

4. The display device of claim 3 where the human readable element is a light emitting diode.

5. The display device as recited in claim 1 wherein the first manner is a low frequency modulation and the second manner is a high frequency modulation.

* * * * *